United States Patent [19]
Morita

[11] Patent Number: 5,825,572
[45] Date of Patent: Oct. 20, 1998

[54] APPARATUS AND METHOD FOR RECORDING DATA ACCORDING TO A MEASURED TRANSFER SPEED

[75] Inventor: Shinya Morita, Kanagawa, Japan

[73] Assignee: Sony Corporation, Tokyo, Japan

[21] Appl. No.: 549,826

[22] PCT Filed: Mar. 28, 1995

[86] PCT No.: PCT/JP95/00573

§ 371 Date: Jun. 21, 1996

§ 102(e) Date: Jun. 21, 1996

[87] PCT Pub. No.: WO95/26552

PCT Pub. Date: Oct. 5, 1995

[30] Foreign Application Priority Data

Mar. 28, 1994 [JP] Japan .................................. 6-057451
Aug. 1, 1994 [JP] Japan .................................. 6-180262

[51] Int. Cl.[6] .................................................. G11B 15/18
[52] U.S. Cl. ........................................ 360/69; 360/71
[58] Field of Search ................................. 360/15, 51, 8, 360/70, 31, 71, 72.1, 72.3, 73.01, 74.2, 74.3; 369/60, 47, 32; 386/120, 81, 87

[56] References Cited

U.S. PATENT DOCUMENTS

| | | | |
|---|---|---|---|
| 3,775,568 | 11/1973 | Hino et al. | 360/8 |
| 5,045,954 | 9/1991 | Oishi et al. | 360/8 |
| 5,161,143 | 11/1992 | Fukushima et al. | 369/53 |
| 5,241,432 | 8/1993 | Sota et al. | 360/15 |
| 5,243,476 | 9/1993 | Hong | 360/15 |
| 5,276,662 | 1/1994 | Shaver, Jr. et al. | 369/53 |
| 5,291,468 | 3/1994 | Carmon et al. | 369/60 |
| 5,463,607 | 10/1995 | Roth et al. | 369/60 |
| 5,559,643 | 9/1996 | Makise et al. | 360/8 |
| 5,642,338 | 6/1997 | Fukushima et al. | 369/60 |

FOREIGN PATENT DOCUMENTS 2-240867  9/1990  Japan .
3-240818  10/1991  Japan .

*Primary Examiner*—Nabil Hindi
*Attorney, Agent, or Firm*—Frommer Lawrence & Haug LLP; William S. Frommer

[57] ABSTRACT

A data recording apparatus is adapted to write and read digital data on and from a recording medium such as a tape, a disk or the like driven by a driving mechanism, so as to be applicable to recording of computer data, collection of experiment data in a variety of experiment instruments, recording of a variety of observation data, and so on. For writing and reading data while controlling the driving mechanism to run and stop the recording medium, a buffer memory is provided in order to coordinate a data recording or reproduction effected on the recording medium with a data transfer speed of a data transferred from and to an external apparatus such as a host computer. The data recording and reproducing amount and the operation of the driving mechanism are controlled based on the data transfer speed of data transferred to the buffer memory.

5 Claims, 12 Drawing Sheets

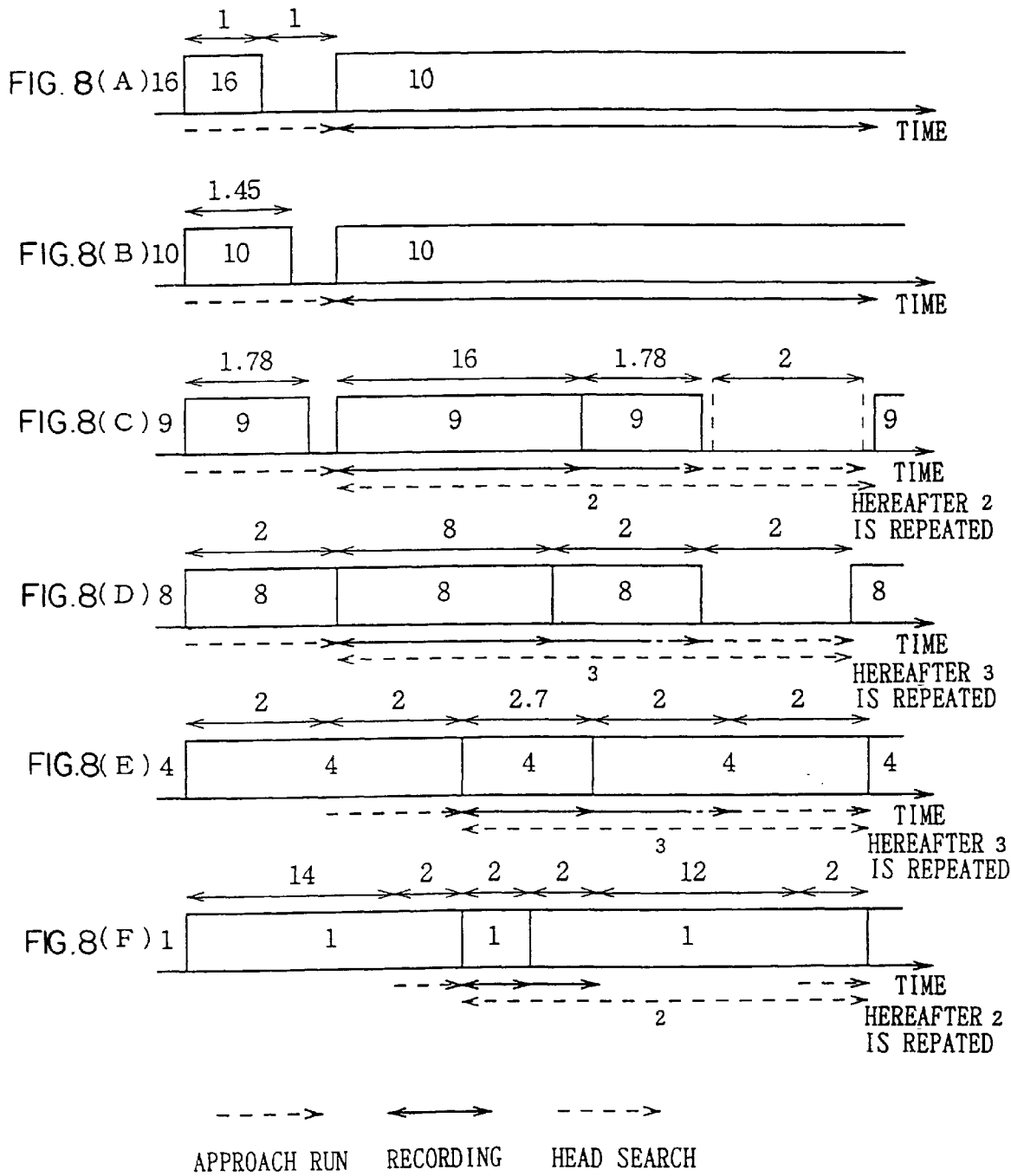

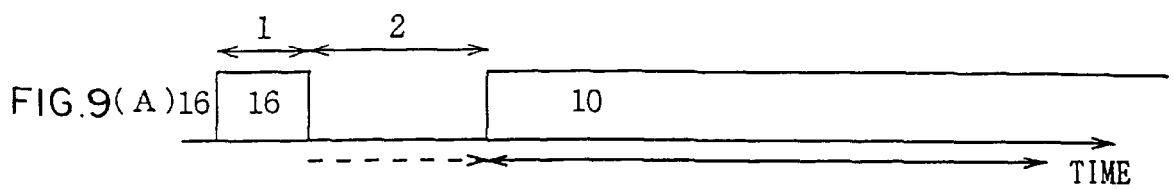
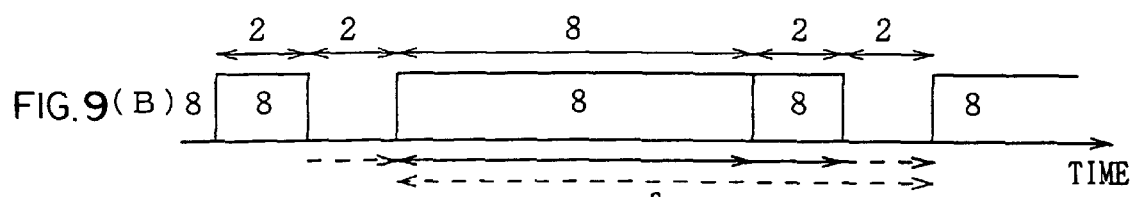
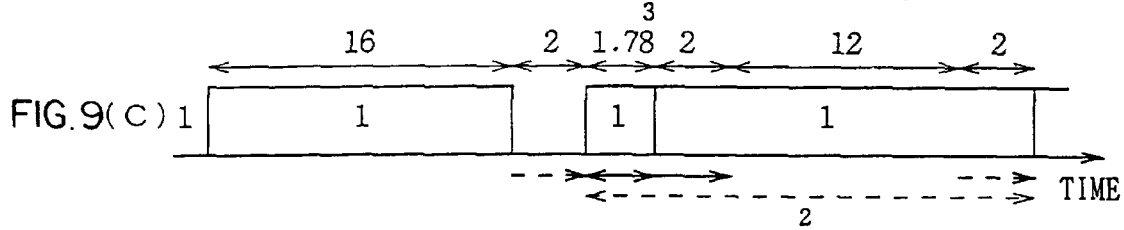
- - - →  ←—→  - - - →
APPROACH RUN   RECORDING   HEAD SEARCH

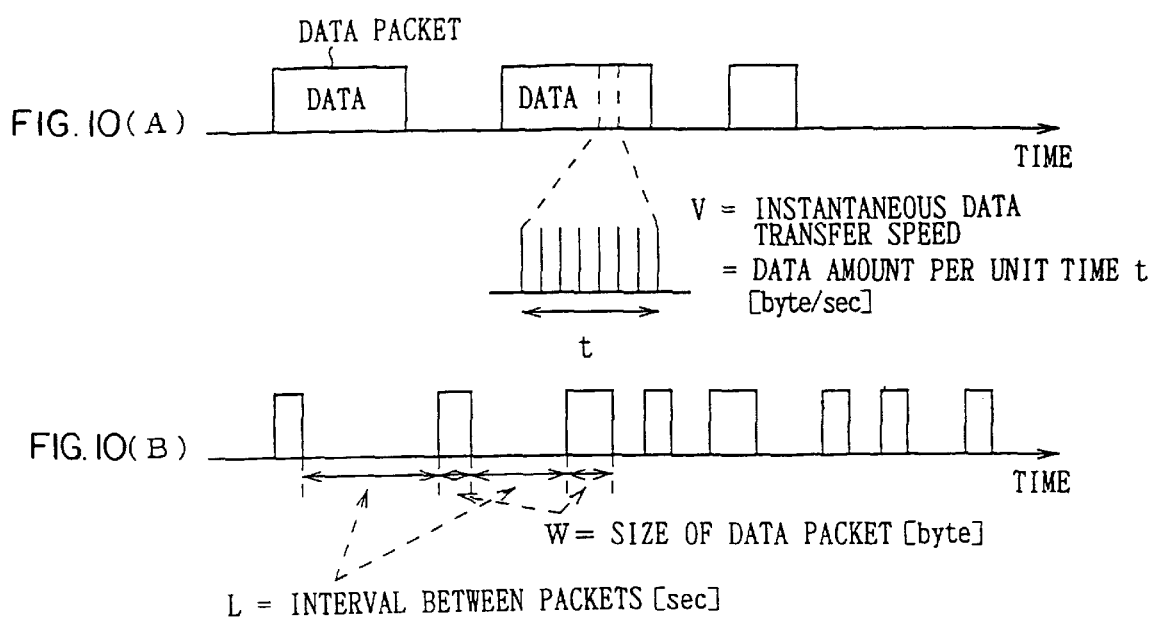

APPARATUS AND METHOD FOR RECORDING DATA ACCORDING TO A MEASURED TRANSFER SPEED

TECHNICAL FIELD

The present invention relates to a data recording apparatus, and more particularly, is suitable for use in a data recorder which records digital data transferred thereto from the outside on a recording medium driven by a driving mechanism and reads said recorded digital data to transfer it to a computer, for example, like a tape recorder.

BACKGROUND ART

Conventionally, data recorders have been proposed for recording data from a computer on a recording medium or for transferring data read from the recording medium to the computer. Specifically, referring to FIG. 1, a data recorder 3 temporarily stores digital data transferred thereto from a host computer 1 through a transfer line 2 into a buffer memory unit 4 provided therein, and then records the digital data temporarily stored in the buffer memory unit 4 on a tape by a recording means provided in a data recording unit 5, for example, a digital tape recorder.

Data read from the recording means provided in the data recording unit 5 is temporarily stored into the buffer memory unit 4 and then transferred to the computer 1 through the transfer line 2.

In the configuration shown in FIG. 1, generally, since a data processing speed of the computer 1 does not necessarily match with a recording or reproducing speed of the data recording unit 5, a remaining capacity of the buffer memory unit 4 (an amount of free region in which data can be recorded) is detected upon recording or reading data in the data recording unit 5, such that the recording or reproducing operation of the recording means in the data recording unit 5 is controlled based on the remaining capacity to carry out the data transfer between the computer 1 and the data recording unit 5 without dropping any data.

In practice, an interface in conformity to the SCSI (Small Computer System Interface, ANSI X3.131-1986) standard, for example is used as an interface between the data recorder 3 and the computer 1. Also, employed as the data recording unit 5 is an apparatus for recording digital data on recording tracks helically formed on a tape for digital VTR (Video Tape Recorder) use.

The conventional data recorder 3 of the above-mentioned type has a problem in that since the driving mechanism of the data recording unit 5 is controlled only in accordance with a remaining capacity in the buffer memory unit 4, data cannot be transferred in an optimal condition in terms of average data transfer speed.

Giving supplementary explanation for better understanding, an amount of data transferred from the computer 1 to the data recorder 3 or a data transfer speed at which data is transferred from the computer 1 to the data recorder 3 is not constant depending on a data processing state in the computer 1. Thus, it is difficult to practically predict the timing and speed at which data is transferred from the computer 1.

On the other hand, when a tape is used as a recording medium for the data recording unit 5, data supply to the data recording unit 5 must be started at a timing at which the tape run is started (at the timing at which the head of a track to be recorded reaches), and the data recording unit 5 must be continuously supplied with data at a fixed speed (for example 10M [bytes/sec]). As a result, if data to be supplied is exhausted in the buffer memory unit 4, the recording in the recording unit 5 must be once stopped. Then, the tape is rewound for a head point search and is run from the head point at a timing at which data supply is started again such that the data recording is resumed in synchronism with the tape running.

Thus, the buffer memory unit 4 provides a function of matching the processing operation of the computer 1 with the processing operation of the data recording unit 5. However, if the driving mechanism of the data recording unit 5 is controlled only in accordance with a remaining capacity of the buffer memory unit 4 as before, the data transfer speed cannot be effectively controlled.

Also, when a tape is used as a recording medium for the data recording unit 5, the tape must be released from tension applied thereto, a rotary drum be stopped, and so on when data cannot be supplied from the buffer memory unit 4 to the data recording unit 5.

It should be understood that if a tape is stopped for a long time in a tension applied state with a rotary drum being rotated, the tape is very likely to be damaged. For this reason, when the supply of data from the buffer memory unit 4 to the data recording unit 5 is interrupted, the data recording unit 5 must be properly controlled to release the tape from the tension and simultaneously stop the rotary drum (this controlled is called the "standby-off"). Then, at the time the data supply is resumed, the data recording unit 5 must be properly controlled to apply the tape with the tension and simultaneously rotate the rotary drum (this control is called the "standby-on").

DISCLOSURE OF THE INVENTION

The present invention has been made in view of the problems mentioned above, and its object is to provide a data recording apparatus which is capable of optimizing data transfer between a computer and a data recorder and effectively avoiding possible damages on a recording medium used in the data recorder.

According to the present invention, data is recorded in such a manner that data transmitted from a data supply source is temporarily stored into a memory, and the data from the memory is recorded on a tape-like recording medium by a recording means. The reading of the data from the memory, the running of the tape-like recording medium in the recording means, and the recording of the data on the tape-like recording medium are controlled by a control means based on a data transfer speed from the data supply source measured by a measuring means.

Since the data transfer speed from the data supply source varies in accordance with the necessity on the data supply source side, data cannot be efficiently recorded on a tape-like recording medium simply by controlling the recording means to record the data on the tape-like recording medium based only on an amount of data stored in the memory.

According to the data recording apparatus provided by the present invention, the reading of data from the memory, running of the tape-like recording medium, and the recording of the data on the tape-like recording medium are controlled based on a data transfer speed from the data supply source. In this way, if the speed of the data transferred from the data supply source varies, the recording means is adaptively responsive to the variations to realize efficient data recording on the tape-like recording medium.

BRIEF DESCRIPTION OF THE DRAWINGS

FIGS. 8(A) to 8(F) are time charts showing how various input data are recorded;

FIGS. 9(A) to 9(C) are time charts used for explaining undesirable data recording implementations;

FIGS. 10(A) to 10(B) are time charts used for explaining transferred data;

BEST MODE FOR CARRYING OUT THE INVENTION

Embodiments of the present invention will hereinafter be described in detail with reference to the accompanying drawings.

(1) General Configuration

Figure 1:
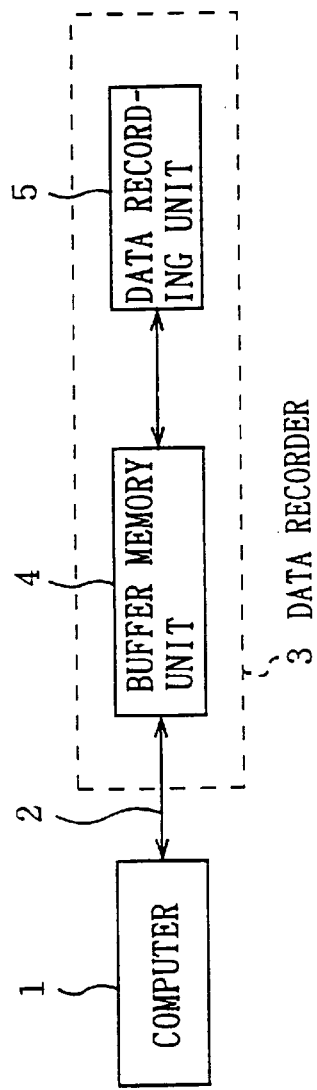
FIG. 1 is a block diagram schematically showing the configuration of a conventional data recording apparatus.
Figure 2:
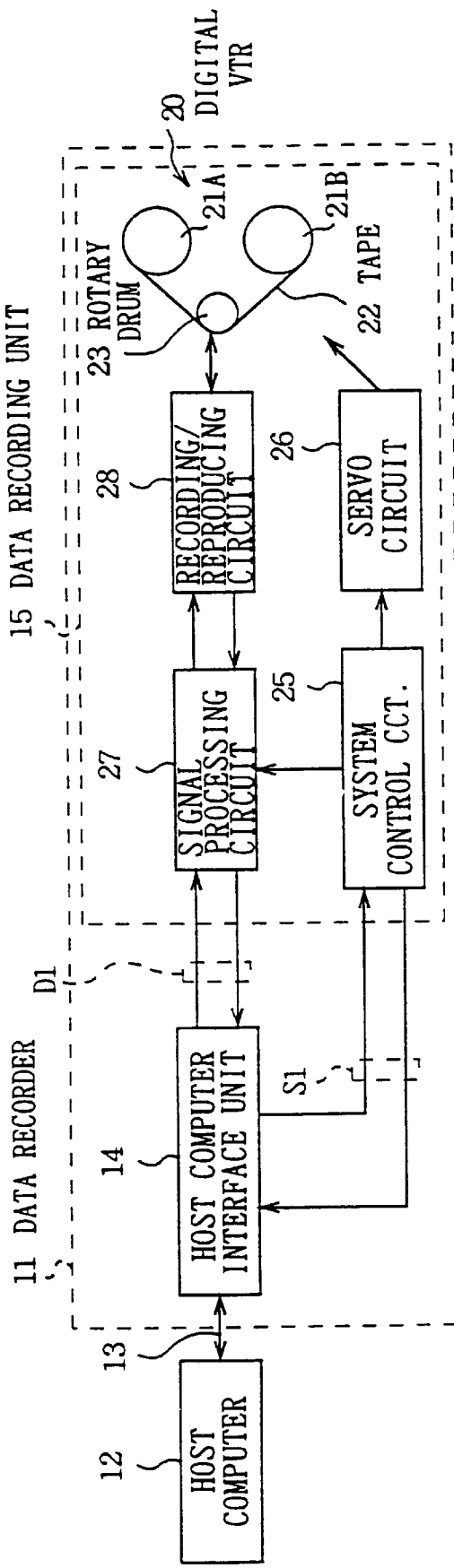
FIG. 2 is a block diagram generally showing the configuration of a data recording apparatus according to the present invention.

Referring first to FIG. 2, a data recording apparatus according to the present invention comprises a data recorder 11 which receives data transferred thereto from a host computer 12 as a data supply source through a transmission path 13 at a host computer interface unit 14 and records the received data in a data recording unit 15, as well as delivers data recorded on a recording medium in the data recording unit 15 through the host computer interface unit 14 to the transmission path 13 such that the host computer 12 can read the delivered data.

In this embodiment, the data recording unit 15 is structured such that a digital video tape recorder (digital VTR) 20 can be loaded with a cassette tape having a tape 22 laid between a pair of reels 21A and 21B as a data recording medium. When the cassette tape 22 is inserted into the digital VTR 20, digital data is recorded on recording tracks obliquely formed on the tape 22 by rotary magnetic heads arranged on a rotary drum 23 of the digital VTR 20, and digital data recorded on the recording tracks is reproduced by the rotary magnetic heads.

When data is recorded on or reproduced from the tape 22, a system control circuit 25 controls a servo circuit 26 based on a control signal S1 supplied from the host computer interface unit 14 to control the running of the tape 22, the rotation or stop of the rotary drum 23, and application or release of tape tension to the tape 22. In other words, the aforementioned standby-on and standby-off controls are performed for the digital VTR 20.

In a recording mode, the system control circuit 25, responsible for controlling the running of the tape 22, controls a signal processing circuit 27 to add an error correcting code to and perform modulation on digital data D1 supplied from the host computer interface unit 14. Then, the modulated digital data D1 with the error correcting code is equalized by a recording/reproducing circuit 28, and recorded on recording tracks on the tape 22 by the recording/reproducing heads on the rotary drum 23 in the digital VTR 20.

In a reproduction mode, data reproduced by the recording/reproducing heads on the rotary drum 23 is equalized by the recording/reproducing circuit 28. The system control circuit 25 controls the signal processing circuit 27 to perform demodulation and error correcting processing on the equalized data and to supply the processed data to the host computer interface unit 14 as reproduced data D1. The host computer interface unit 14 then transfers the reproduced data D1 to the host computer 12 through the transmission path 13 based on the control signal S1 from the system control circuit 25.

In this way, the host computer 12 can record data to be recorded on the tape 22 in the data recorder 11, and read the recorded data from the data recorder 11 as required.

(2) Host Computer Interface Unit

Figure 3:
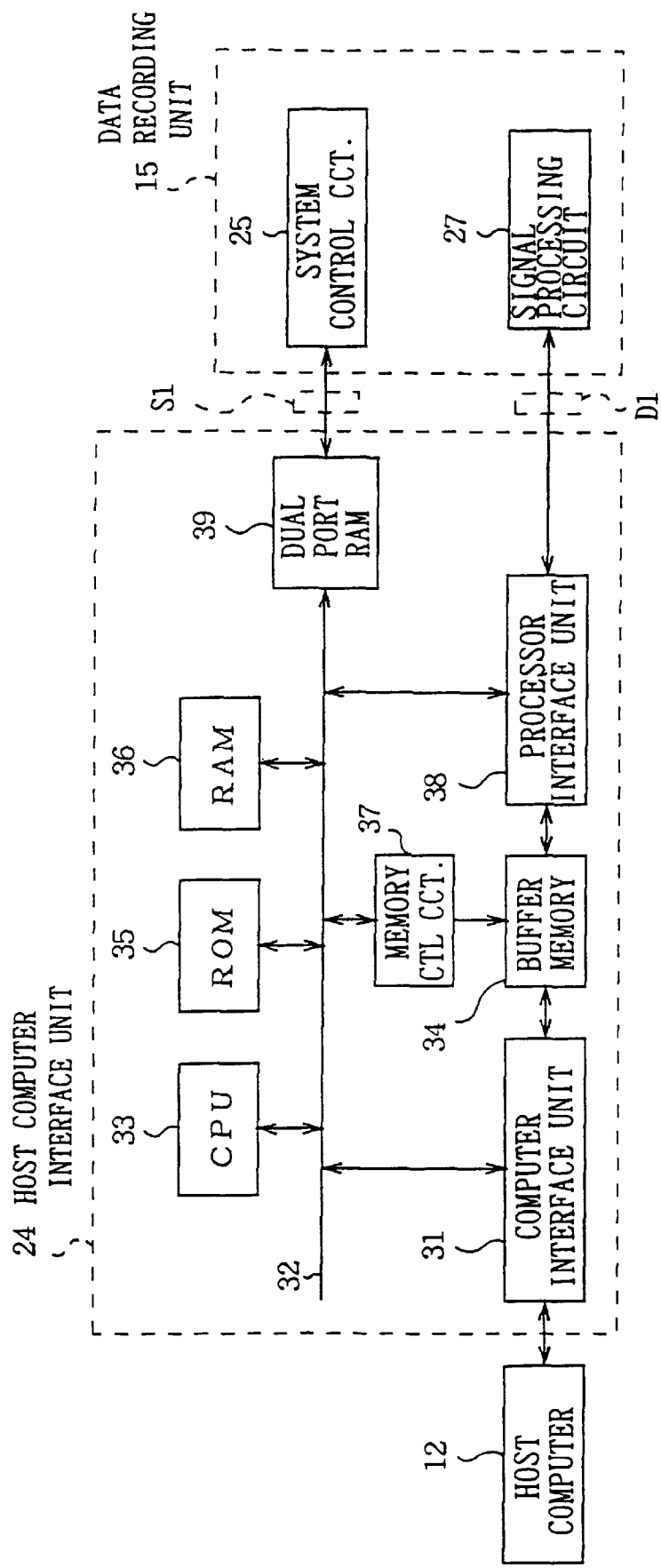
FIG. 3 is a block diagram showing in detail the configuration of a host computer interface unit in FIG. 2.

Referring next to FIG. 3, in the host computer interface unit 14, signals transferred thereto from the host computer 12 is received at a computer interface unit 31, and separated into a command portion and a data portion by the computer interface unit 31. The command portion is supplied to a central processing unit (CPU) 33 through a bus 32, while the data portion is temporarily stored in a buffer memory 34.

The CPU 33, thus supplied with commands, executes data processing in accordance with an associated program stored in a read only memory (ROM) 35 using a work area in a random access memory (RAM) 36. Then, the CPU 33 controls a buffer memory control circuit 37 for the buffer memory 34 and a processor interface unit 38 based on the result of the data processing to transfer data stored in the buffer memory 34 to the signal processing circuit 27 in the data recording unit 15 through the processor interface unit 38 as data D1 to be recorded.

In this embodiment, the buffer memory 34, which has a FIFO (First In First Out) structure, enables data to be freely written into an empty region thereof as well as stored data to be freely read therefrom. The buffer memory 34 may provide its memory region as an empty region.

In addition, the CPU 33 transfers the control signal S1 to the system control circuit 25 in the data recording unit 15 through a dual port RAM 39, in order to instruct the digital VTR 20 to record and reproduce data on and from a tape 22 under the control of the system control circuit 25 in the data recording unit 15.

In this embodiment, the computer interface unit 31 constitutes an interface conforming to the SCSI (Small Computer System Interface, ANSI X3.131-1986) standard, and executes processing for coordinating data transferred from the host computer 12 into units of data to be recorded on a tape (for example, units of 12 tracks, i.e., 384 k[bites]). This processing is called "blocking". The computer interface unit 31 also executes processing such as addition of subcode data to such blocks of data in order to collect data under each of identification names of files specified by the host computer 12 to permit a head search for a desired file upon reproduction. The data thus processed is transferred to the buffer memory 34.

The data coordinated in one unit in the computer interface unit 31 and temporarily stored in the buffer memory 34 as described above is sent to the signal processing circuit 27 in the data recording unit 15 through the processor interface unit 38, and is added an error correcting code and modulated in a signal format which enables the data to be recorded on the tape 22. Then, the modulated data is equalized in the recording/reproducing circuit 28 and recorded on the tape 22.

A reproduced signal picked up from the tape 22 in accordance with a processing program for the CPU 33 upon reproduction is equalized in the recording/reproducing circuit 28, and then sent to the signal processing circuit 27 which performs error correction on the reproduced signal and transfers the error corrected signal as reproduced data D1 through the processor interface unit 38 to the buffer memory 34 for temporary storage.

Since the data temporarily stored in the buffer memory 34 has the subcode which enables the computer interface unit 31 to recognize the end of each file, the data is transferred to the host computer 12 as data which is accessible in accordance with a file number and data size requested by the host computer 12.

Figure 4:
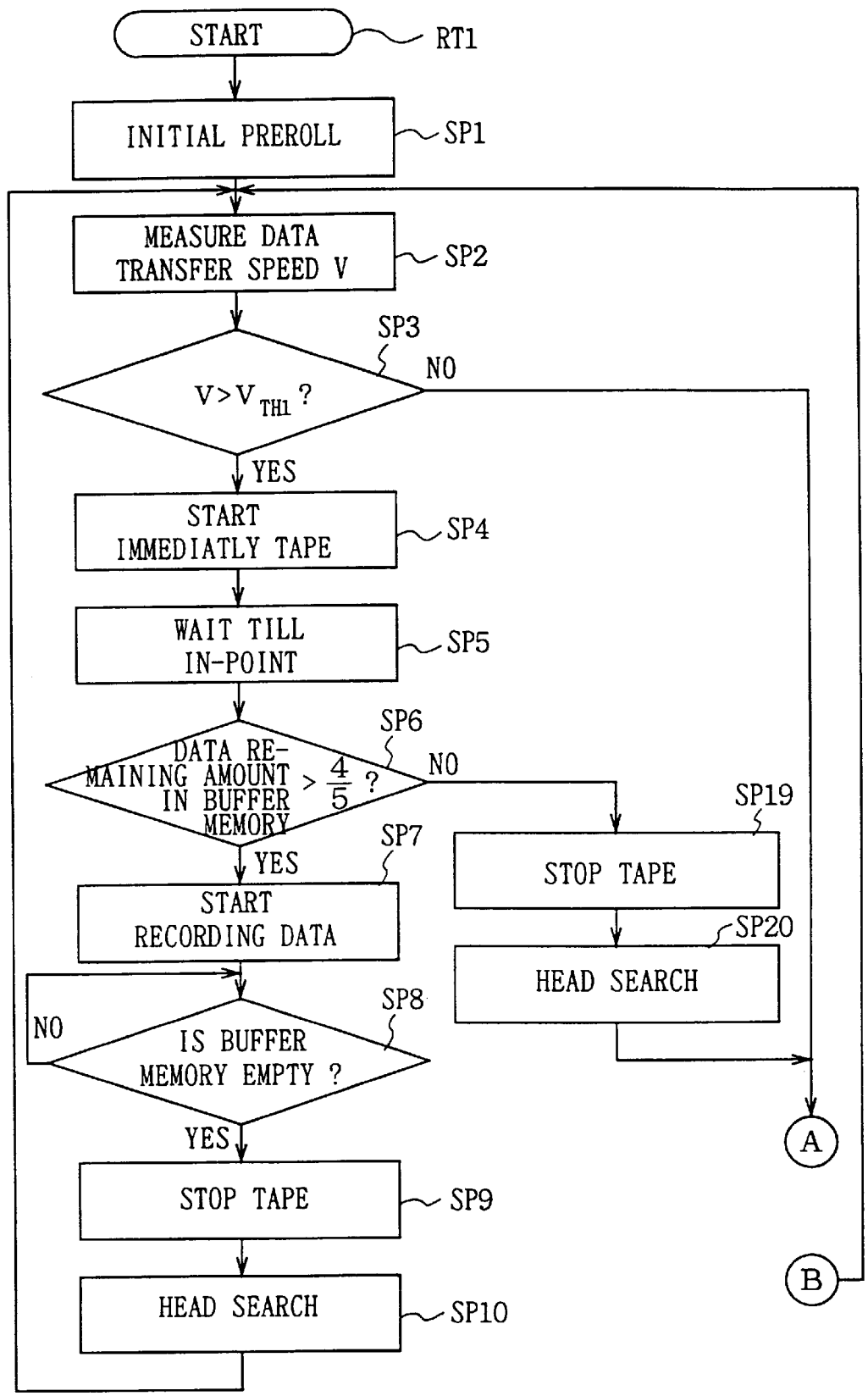
FIGS. 4 and 5 show in combination a flow chart representing a data write processing routine.
Figure 5:
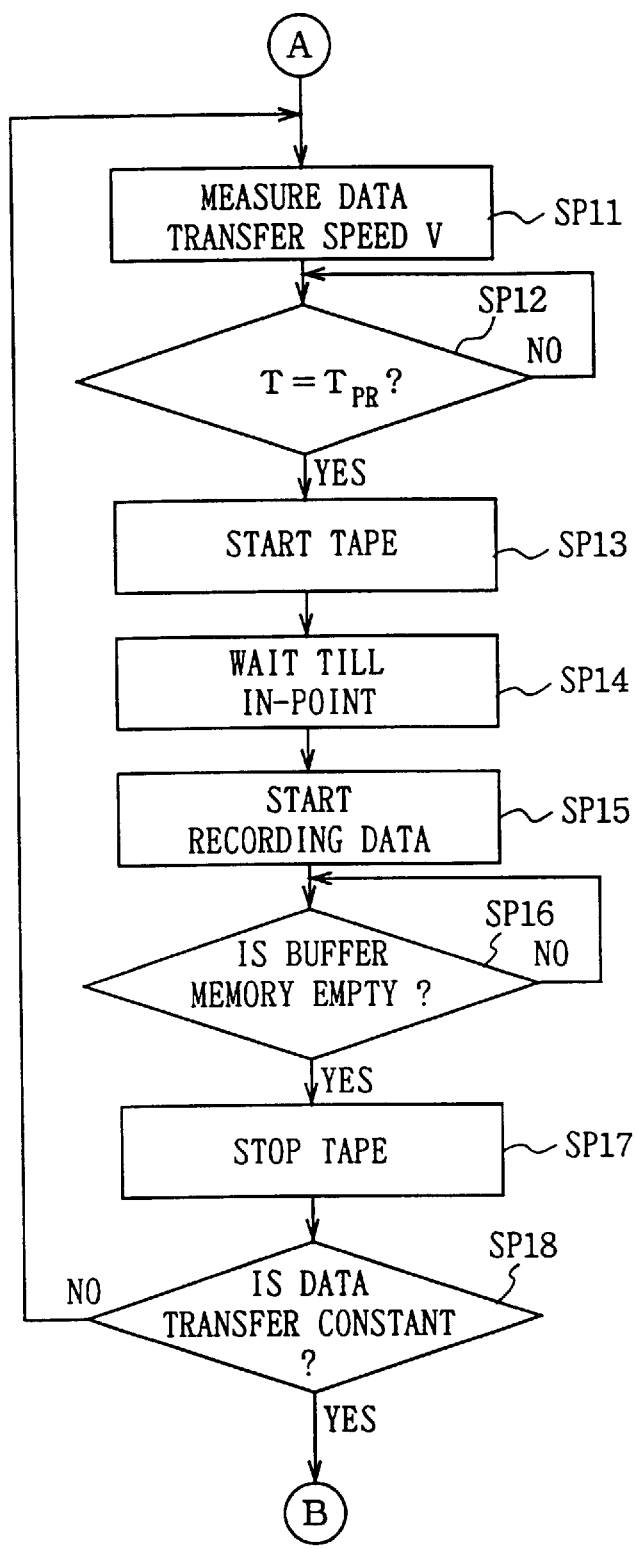

The CPU 33 executes a data write processing routine RT1 shown in FIGS. 4 and 5 for efficiently recording a stream of data sequentially transferred from the host computer 12 in the data recording unit 15 corresponding to a transfer speed of the data. If the stream of data to be recorded in the data recording unit 15 is likely to interrupt during such write processing, the CPU 33 executes a standby-on/standby-off processing routine shown in FIG. 12 to perform predictive control to reliably protect the tape 22 in the data recording unit 15.

The CPU 33, when entering the data write processing routine RT1 (FIG. 4) for recording data from the host computer 12 by the digital VTR 20 in the data recording unit 15, instructs the digital VTR 20 to initially preroll the tape 22 at step SP1, and measures a data transfer speed V of data from the host computer 12 at step SP2.

Figure 6:
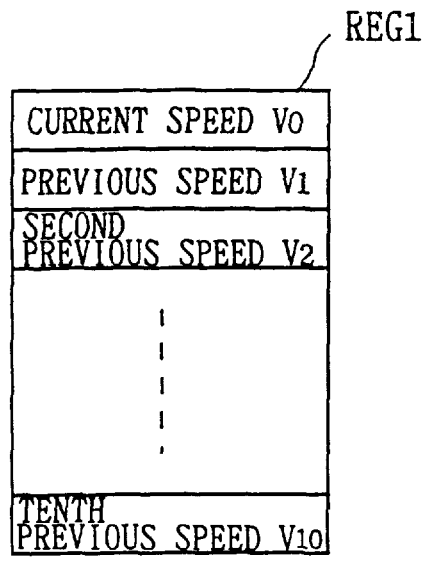
FIG. 6 is a diagram showing a transfer speed register.

Explaining more specifically the measurement of the data transfer speed, as a recording data portion in transferred data from the host computer 12, separated from a command portion, passes through the computer interface unit 31, the CPU 33 measures the transfer speed of the recording data, for example, every 0.1 [sec], and holds the measured speed in a transfer speed register REG1 (FIG. 6) reserved in the RAM 36 as the current speed $V_0$, speed $V_1$ at the previous measurement, speed $V_2$ at the second previous measurement, . . . , speed $V_{10}$ at the tenth previous measurement. Then, the CPU 33 uses the current speed $V_0$ in the transfer speed register REG1 as the data transfer speed V when executing the processing at step SP2.

Since the SCSI interface is employed, the transfer speed V actually transferred from the host computer 12 to the computer interface unit 31 is controlled to be in a range of 0 to 20M [bytes/sec].

Subsequently, the CPU 33 determines at step SP3 whether or not the measured data transfer speed V is larger than a predetermined reference value $V_{TH1}$. The reference value $V_{TH1}$ is selected to be a data transfer speed which causes the buffer memory 34 in an empty state to be filled with data from the host computer 12 in a initiation period of the digital VTR 20 in which the digital VTR 20 in an inoperative state proceeds to a stably recordable state. When the CPU 33 obtains an affirmative result at step SP3, this means that data is being transferred from the host computer 12 to the buffer memory 34 at a relatively high data transfer speed. In this event, the CPU 33, proceeding to step SP4, instructs the system control circuit 25 in the data recording unit 15 through the dual port RAM 39 to immediately start the tape 22 in the digital VTR 20, and also at next step SP5, instructs the memory control circuit 37 to suspend the delivery of data from the buffer memory 34 to the signal processing circuit 27 through the processor interface unit 38 until the head of the recordable portion of the tape 22 reaches an in-point.

In this embodiment, the digital VTR 20 requires a period of two seconds to run the tape 22 from the initial prerolled stated at step SP1 to the recordable position (i.e., until the tape 22 reaches the in-point), while the buffer memory 34 has a storing capacity of 16M [bytes]. Thus, the reference value $V_{TH1}$ is selected to be a data transfer speed which can supply 16M [bytes] of data to the buffer memory 34 in two seconds, i.e., 8M [bytes].

Thus, while the tape 22 is running for two seconds at steps SP4 and SP5, data can be continuously transferred from the host computer 12 to the buffer memory 34.

When the two seconds of the approach run period has elapsed at step SP5, the CPU 33 proceeds to step SP6 to determine whether or not an amount of data remaining in the buffer memory 34 is larger than ⅘ of its full capacity. An affirmative result obtained at this step means that an amount of data equal to or more than ⅘ of the storing capacity still remains in the buffer memory 34. In response, the CPU 33 instructs the system control circuit 25 in the data recording unit 15 to start the recording of data, thereby causing the digital VTR 20 to start recording data in the buffer memory 34 on the tape 22 through the signal processing circuit 27.

In this way, the data recording apparatus is controlled to record data in the buffer memory 34 on the tape 22 at a recording speed unique to the digital VTR 20 (at 10M [bytes/sec] in this embodiment]).

As described above, data is sequentially transferred from the buffer memory 34 through the processor interface unit 38 to the data recording unit 15 at the recording speed unique to the digital VTR 20 (at 10M [bytes/sec]). In this state, the CPU 33 determines at next step SP8 whether or not the buffer memory 34 is empty. If a negative result is obtained at this step, this means that an amount of data which is being transferred from the host computer 12 to the buffer memory 34 is balanced with an amount of data which is being recorded from the buffer memory 34 to the data recording unit 15. Thus, the CPU 33 maintains this recording state from the buffer memory 34 to the tape 22.

On the other hand, if an affirmative result is obtained at step SP8, this means that an amount of data transferred from the host computer 12 to the buffer memory 34 is reduced so that data cannot be recorded from the buffer memory 34 on the tape 22 in the data recording unit 15. In this event, at step SP9, the CPU 33 supplies the system control circuit 25 with a control signal to stop running the tape 22 in order to interrupt the data recording from the buffer memory 34 to onto the tape 22.

Since the data transfer to the data recording unit 15 is thus interrupted, the CPU 33 proceeds to step SP10 to supply the system control circuit 25 with a control signal to search for the head of a next recording portion on the tape 22 in order to prepare for the next recording operation. Then, the CPU returns to the foregoing step SP2 to enter the loop for measuring the data transfer speed V from the host computer 12 to the buffer memory 34.

The head search processing at step SP10 requires substantially the same time period as the preroll time at step SP1 (two seconds in this embodiment) for ensuring a time for the approach run of the tape 22 for the next data recording. The CPU, therefore, returns to step SP2 after such a time period equal to the preroll time.

In this way, the CPU 33 enables the data recording unit 15 to sequentially record data transferred from the host computer 12 (in other words, without causing the digital VTR 20 in the data recording unit 15 to intermittently stop the tape 22), when the data transfer speed is a constant and rather high, by executing a loop of steps SP2–SP3–SP4–SP5–SP6–SP7–SP8.

Figure 7:
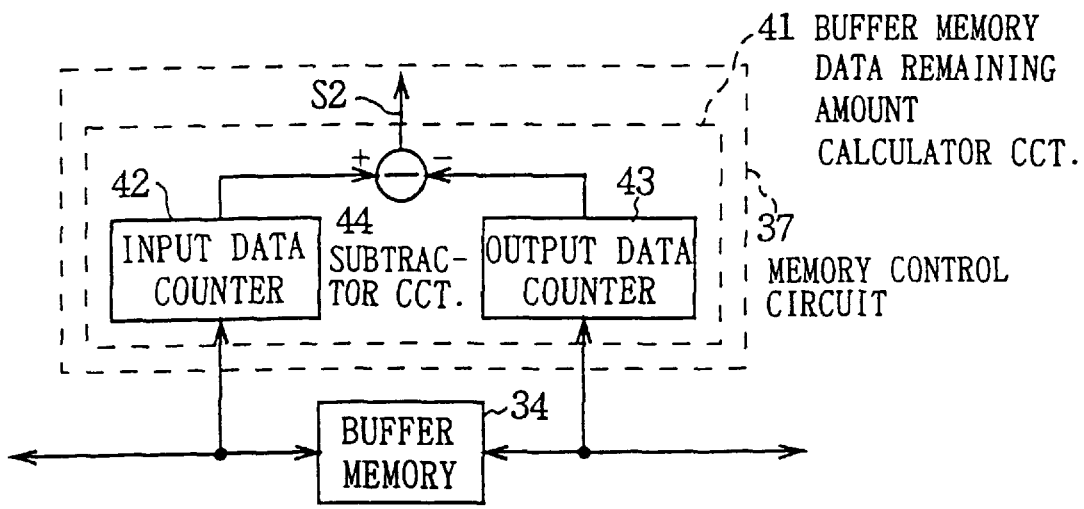
FIG. 7 is a block diagram showing in detail the configuration of a memory control circuit for a buffer memory.

The detection of remaining data in the buffer memory 34 at step SP6 is carried out in the following manner. Referring to FIG. 7 showing the configuration of a buffer memory data remaining amount calculator circuit 41 provided in the memory control circuit 37, an amount of data inputted to the buffer memory 34 is counted by an input data counter 42, while an amount of data outputted from the buffer memory 34 is also counted by an output data counter 43. The output of the counter 43 is subtracted from the output of the counter 42 in a subtractor circuit 44 to derive a data remaining amount output S2 which is supplied to the CPU 33 through the bus 32 and held in a data remaining amount register in the RAM 36. The data remaining amount output S2 is compared with the value representing ⅘ of the full storing capacity of the buffer memory 34 at step SP6 to obtain the determination result.

Incidentally, referring back to the foregoing step SP3, if a negative result is obtained at this step, this means that the data transfer speed from the host computer 12 to the buffer memory 34 is so low that the digital VTR 20 is quite likely to be obliged to stop the tape 22 since the buffer memory 34 will be shortly exhausted if data in the buffer memory 34 is recorded right now at the unique data transfer speed of the digital VTR 20 (i.e., at 10M [bytes/sec]).

In this event, the CPU 33 proceeds to step SP11 in FIG. 5 to measure the transfer speed V of data currently transferred from the host computer 12 to the buffer memory 34, and then determines at step SP12 whether or not the buffer memory 34 is expected to be filled with data in the approach run time of the VTR 20 (i.e. two seconds) if data is sequentially supplied to the buffer memory 34 at the current data transfer speed V measured at step SP11 (whether it is predicted that the buffer memory 34 will be filled with data in two seconds) by checking whether a fill-up prediction time T [sec] is equal to the approach run time $T_{PR}$ (=2 [sec]).

Assuming that the buffer memory 34 is filled with data in two seconds if data is continuously supplied to the buffer memory 34 at the data transfer speed V measured at step SP11, the fill-up prediction time T is calculated by the following equation (1):

$$T[\sec]=(Q_{FL}-Q_{NW})/V \qquad (1)$$

where $Q_{FL}$ is the storing capacity of the buffer memory 34 [bytes]; $Q_{NW}$ is a current data amount in the buffer memory 34 [bytes]; and V is the data transfer speed M [bytes/sec] at which data is currently being supplied to the buffer memory 34.

If the fill-up prediction time T is equal to a time required for the digital VTR 20 to proceed from the preroll state to the recordable state, i.e., the approach run time $T_{PR}$, it is predicted that the buffer memory 34 will be filled with data at the time the digital VTR 20 has run the tape 22 for the approach run time $T_{PR}$. On the other hand, if the fill-up prediction T is larger than the approach run time $T_{PR}$, it is predicted that the buffer memory 34 will not be filled with data at the time the approach run time $T_{PR}$ is over if the tape 22 is started right now.

Therefore, the CPU 33 keeps the tape 22 from running while the fill-up prediction time T is not equal to the approach run time $T_{PR}$ (=2 [sec]), which causes a negative result at step SP12.

When an affirmative result is eventually obtained at step SP12, the CPU 33 starts the approach run of the tape 22 at step SP13, and keeps data from being transferred from the buffer memory 34 to the data recording unit 15 until the tape 22 reaches the in-point at subsequent step SP14. When the tape 22 reaches the in-point, the CPU 33 proceeds to step SP15 to start recording data in the buffer memory 34 on the tape 22.

This recording state is maintained until an affirmative result is obtained at step SP16 indicating that the buffer memory 34 is empty, thus continuously recording data on the tape 22 until the data in the buffer memory 34 is exhausted.

When an affirmative result is eventually obtained at step SP16, meaning that the buffer memory 34 is empty, the CPU 33 stops the tape 22 at step SP17, and then determines at step SP18 whether or not data is being transferred from the host computer 12 to the buffer memory 34 at a constant transfer speed.

The determination at step SP18 can be made in practice by a calculation, possibly executed by the CPU 33, as to whether or not a deviation with respect to an average value of transfer speeds from the current speed $V_0$ to the tenth previous speed $V_{10}$ stored in the transfer speed register REG1 (FIG. 6) in the RAM 36 falls within a predetermined range.

Data may be sequentially transferred from the host computer 12 not only in the form of large data packets as shown in FIG. 10(A) but also as sets of small data packets as shown in FIG. 10(B). Therefore, for detecting the pattern of data transfer, a parameter should be measured as shown in FIGS. 10(A) and 10(B). Specifically, an instantaneous data transfer speed V is calculated by the following equation (2), measuring a transfer time t, for example, for every 512 bytes:

$$V=512/t \text{ [bytes/sec]} \qquad (2)$$

The instantaneous data transfer speed V should be continuously measured. If the value V largely fluctuates each time it is measured, this causes a negative result at step SP18 since the prediction cannot be made because of variable speed data transfer.

Next, the size W [bytes] of each data packet and an interval L [sec] between every two adjacent data packets are measured. These measurements should also be continuously made. If the respective measured values largely fluctuate, for example, 50% from their respective average values, a negative result is obtained at step SP18 as the transfer pattern cannot be predicted.

The negative result at step SP18 means that the transfer speed of data from the host computer 12 to the buffer memory 34 is not constant, that is, the transfer speed of data from the host computer 12 to the buffer memory 34 fluctuates as compared with the unique recording speed (10M [bytes/sec]) of the digital VTR 20, so that the buffer memory 34 is likely to be exhausted only by outputting a unit recording amount of the digital VTR 20 (for example, an amount of data which only fills a portion of 12 recording tracks) from the buffer memory 34, with the result that the data cannot be recorded in such a manner that the recording capacity of the tape may be effectively utilized. In this event, the CPU 33 returns to the foregoing step SP11 to resume the control that makes the digital VTR 20 record data on the tape 22 after the buffer memory 34 is filled with data during the approach run time.

On the other hand, if an affirmative result is obtained at step SP18, this means that data is being transferred from the host computer 12 to the buffer memory 34 at a constant speed, and accordingly data can be stably and efficiently recorded in the data recording unit 15 if the data transfer speed V is sufficiently large, thus causing the CPU 33 to return to the foregoing step SP2 (FIG. 4).

If a negative result is obtained at the foregoing step SP6, this means that an amount of data remaining in the buffer memory 34 is so small that the recording of data by the digital VTR 20 at its unique recording speed (10M [bytes/ sec]) will shortly empty the buffer memory 34, whereby data cannot be recorded on all recording tracks of the tape 22. In this event, the CPU 33 stops the tape 22 at step SP19, performs a head search for the next recording operation at step SP20, and then executes at steps SP11–SP18 the processing for recording data on the tape 22 when the buffer memory 34 is again filled with data from the host computer 12, as described above.

In the foregoing configuration, when data is transferred from the host computer 12 to the buffer memory 34 at a constant data transfer speed, the CPU 33 allows the data recording unit 15 to adaptively and efficiently record the data in the buffer memory 34 on the tape 22 in accordance with the magnitude of the data transfer speed V.

More specifically, when data from the host computer 12 is transferred at a transfer speed larger that the reference value $V_{TH1}$ (=8M [bytes/sec]) at step SP3, for example, at 16M [bytes/sec] or at 10M [bytes/sec] as shown in FIGS. 8(A) and 8(B), the CPU 33 executes the loop of steps SP1–SP2–SP3–SP4–SP5–SP6–SP7–SP8 to store data into the buffer memory 34 to its full capacity while running the tape 22 for the first two seconds as the approach run, and then record data in the buffer memory 34 on the tape 22 at the data recording speed unique to the digital VTR 20 (10M [bytes/sec]).

In this event, when the buffer memory 34 is filled with data, CPU 33 stops data transferred from the host computer 12.

Next, consider that data is transferred from the host computer 12 to the buffer memory 34 at a data transfer speed of 9M [bytes/sec] as shown in FIG. 8(C). After the buffer memory 34 has been filled with data during the approach run time (two seconds, because the buffer memory 34 has a storing capacity of 16M [bytes]), the CPU 33 executes the loop of steps SP1–SP2–SP3–SP4–SP5–SP6–SP7–SP8 to have the digital VTR 20 record the data stored in the buffer memory 34 on the tape 22 at the unique recording speed of the VTR 20 (i.e., at 10M [bytes/sec]) until data in the buffer memory 34 is exhausted. In this event, since the recording speed from the buffer memory 34 to the tape 22 is faster than the data transfer speed from the host computer 12, data in the buffer memory 34 will be eventually exhausted. The CPU 33 detects the exhausted buffer memory 34 at step SP8, interrupts the recording of data from the buffer memory 34 on the tape 22 by the operations at steps SP9, SP10, once stops the tape 22, and again resumes to record data from the buffer memory 34 on the tape 22 after the preroll and approach run time by the operations at steps SP2–SP3–SP4–SP5–SP6–SP7–SP8.

Next, consider that data is transferred from the host computer 12 to the buffer memory 34 at transfer speeds of 8M [bytes/sec], 4M [bytes/sec], and 1M [bytes/sec], respectively, as shown in FIGS. 8(D), 8(E), and 8(F). The CPU 33, responsively, executes a loop of steps SP1–SP2–SP3–SP11–SP12 to store data from the host computer 12 into the buffer memory 34 after the approach run time $T_{PR}$ (=two seconds) of the tape 22 until the buffer memory 34 is filled with the data. Then, the CPU 33 executes a loop of steps SP13–SP14–SP15–SP16 to record data in the buffer memory 34 on the tape 22 until the data in the buffer memory 34 is exhausted.

When the buffer memory 34 is eventually exhausted, the CPU 33 determines the exhausted buffer memory 34 at step SP16 and executes a loop of steps SP17–SP18–SP2–SP3–SP11–SP12 to write data from the host computer 12 into the buffer memory 34 until the time the buffer memory 34 is predicted to be again filled with data during the approach run time $T_{PR}$.

Thus, according to the configuration described above, when data is transferred from the host computer 12 to the buffer memory 34 at a constant transfer speed, data in the buffer memory 34, i.e., an amount of data equal to the full capacity of the buffer memory 34 can be recorded at a stroke on the tape 22 after the buffer memory 34 is filled with the data depending on the magnitude of the transfer speed, thus effectively utilizing recording tracks of the tape 22.

With the foregoing configuration, depending on the data transfer speed of data from the host computer 12 to the buffer memory 34, the CPU 33 adaptively executes the processing in one of a loop of steps SP2–SP3–SP4–SP5–SP6–SP7–SP8–SP9–SP10–SP2, a loop of steps SP2–SP3–SP11–SP12–SP13–SP14–SP15–SP16–SP17–SP18–SP2, and a loop including SP2–SP3–SP4–SP5–SP19–SP20–SP11–SP12–SP13–SP14–SP15–SP16–SP17–SP18–SP2 to accomplish efficient data transfer in accordance with the data transfer speed of data from the host computer 12 to the buffer memory 34 without uselessly interrupting the recording operation of the digital VTR for recording data from the buffer memory 34 on the tape 22.

For the purpose of comparison, referring to FIGS. 9(A), 9(B), 9(C) respectively corresponding to FIGS. FIGS. 8(A), 8(B), 8(F), if the tape 22 is started after the buffer memory 34 is filled with data without fail, as executed by a loop of steps SP11–SP18 in FIG. 5, the data transfer from the host computer 12 to the buffer memory 34 is inevitably interrupted during a period from the time the tape 22 is started to the time recording is started, thus correspondingly degrading the efficiency of the data processing.

In practice, even if an amount of data transferred per unit time t is uniform, the data is often transferred in the form of packets each containing an amount of data blocked as required by the processing, with intervals L intervening between the packets, as shown in FIGS. 10(A) and 10(B). When such data blocks are transferred from the host computer 12 to the buffer memory 34, the CPU 33 can effectively record such data by executing the processing which is initiated when the determination result at step SP18 is negative. Specifically, as described above in connection with FIG. 5, data is recorded as the fully loaded buffer memory 34 is confirmed.

Figure 11A:
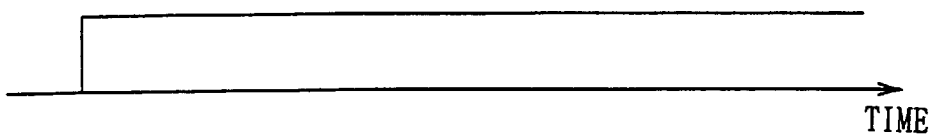
FIGS. 11(A) to 11(F) are time charts used for explaining various input data to be recorded.
Figure 11B:
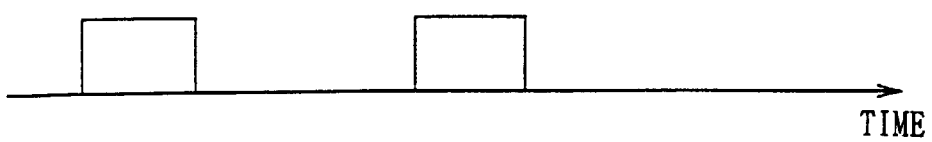
Figure 11C:
Figure 11D:
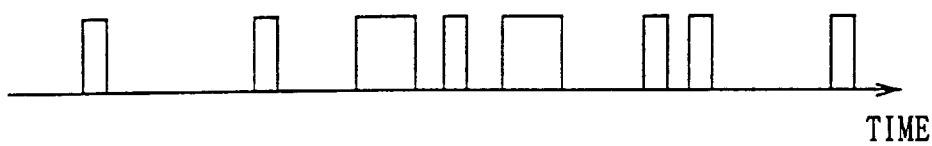
Figure 11E:
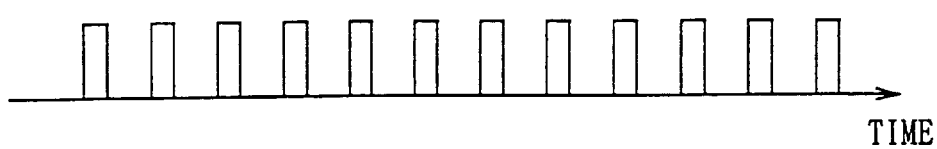
Figure 11F:
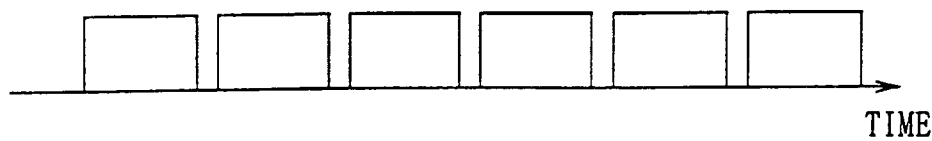

As described above, in either case of when fast sequential data such as raw data from an experiment data collecting apparatus, by way of example, is written from the host computer 12 into the buffer 34 as shown in FIG. 11(A), when large blocks of data such as calculation results of computer graphics are intermittently transferred as shown in FIG. 11(B), when small blocks of data such as calculation results of a high-speed computer are frequently transferred as shown in FIG. 11(C), when irregular data blocks in terms of the size and transfer speed, such as data resulting from a batch processing program with a low execution priority, are transferred as shown in FIG. 11(D), when relatively small blocks of data, such as backup data for a low-speed hard disk drive, is sometimes transferred as shown in FIG. 11(E), and when large blocks of data such as those collectively processed by a high-speed computer are frequently transferred, the data recorder according to the foregoing embodiment is capable of highly efficiently writing data from the host computer 12 into the buffer memory 34 as well as recording data from the buffer memory 34 on the tape 22 by the digital VTR 20 in the data recording unit 15. In addition, this data recorder can be readily realized.

(4) Standby-on/Standby-off Processing

Figure 12:
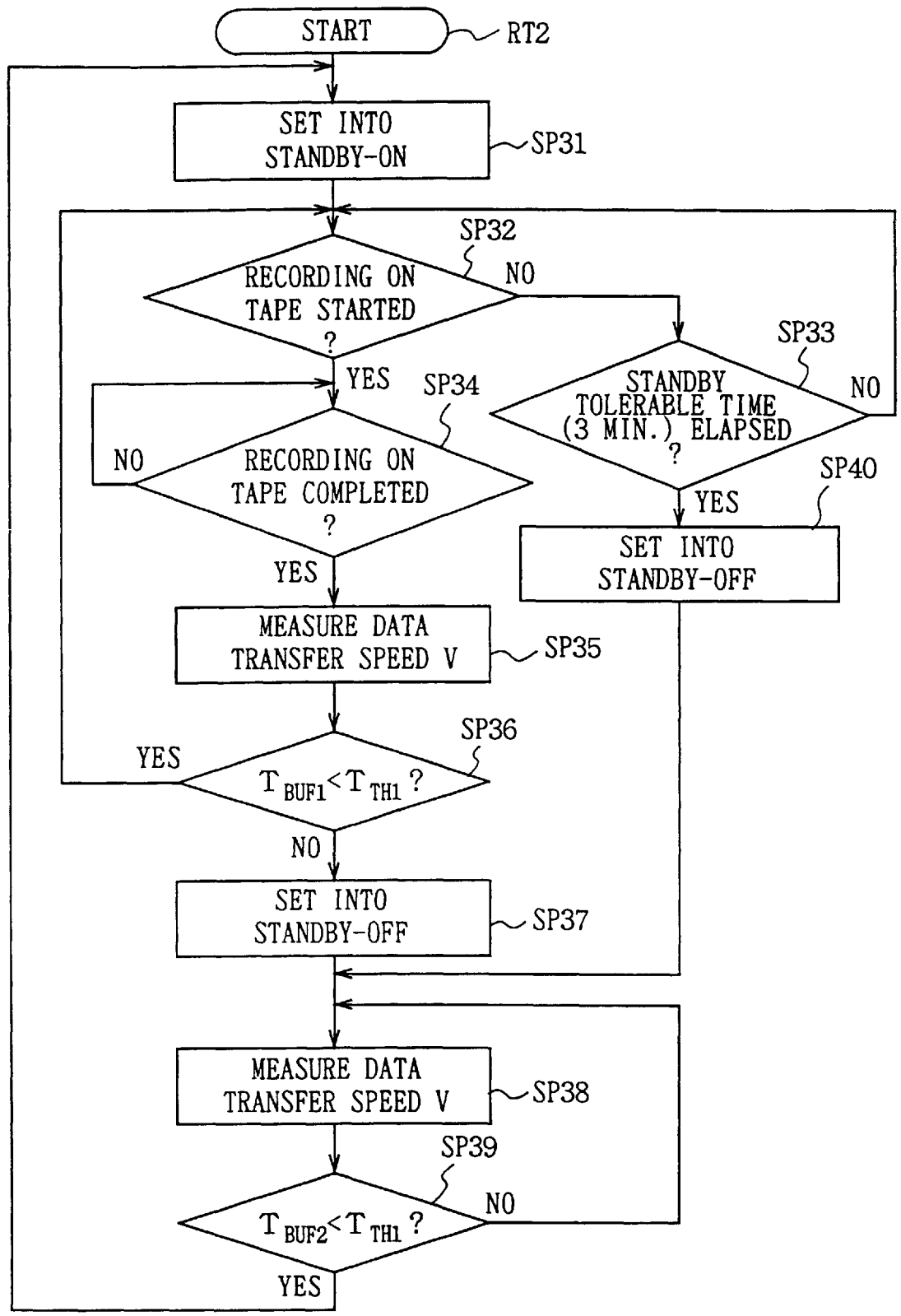
FIG. 12 is a flow chart representing a standby-on/standby-off processing routine.

When data in the buffer memory 34 is not recorded on the tape 22 in the data recording unit 15, the CPU 33 executes "standby-off" processing for releasing tension applied to the tape 22 and for stopping the rotation of the rotary drum 23 in the data recording unit 15 as well as return processing for returning from a standby-off state to a standby-on state in accordance with a processing procedure for a standby-on/standby-off processing routine RT2 shown in FIG. 12.

The CPU 33, when entering the standby-on/standby-off processing routine RT2, first provides at step SP31 a standby-on processing command to the system control circuit 25 which responsively sets a state in which the rotary drum 23 is rotated and the tape 22 is applied with predetermined tension by the servo circuit 26.

Subsequently, the CPU 33 determines at step SP32 whether or not the recording of data from the buffer memory 34 on the tape 22 is started in the digital VTR 20. If a negative result is obtained, the CPU 33 proceeds to step SP33 to determine whether or not a standby tolerable time (set to three minutes in this embodiment) has elapsed. The standby tolerable time refers to the longest possible time in which the digital VTR 20 can remain in the standby-on state. If the standby tolerable time has not been elapsed, the CPU 33 returns to step SP32. The CPU 33 waits for the digital VTR 20 to start the data recording on the tape 22 by repeatedly executing a loop of steps SP32–SP33–SP32.

In this waiting state of the CPU 33, if an affirmative result is obtained at step SP32 before the standby tolerable time has elapsed, this means that the digital VTR 20 has started recording data from the buffer memory 34 on the tape 22. The CPU 33 then proceeds to step SP34 to wait for an interrupt or completion of data recording on the tape 22.

During this state, the CPU 33 controls the system control circuit 25 in the data recording unit 15 to record data in the buffer memory 34 on the tape 20 by the digital VTR 20.

When the data recording on the tape 22 is eventually completed, an affirmative result is obtained at step SP34. Responsively, the CPU 33 measures at next step SP35 a data transfer speed V of data transferred from the host computer 12 to the buffer memory 34 through the computer interface unit 31, and determines at next step SP36 whether or not a buffer memory filling time $T_{BUF1}$ required to fill the buffer memory 34 with data transferred at the measured data transfer speed V is smaller than a tolerable time $T_{TH1}$. The buffer memory filling time $T_{BUF1}$ is expressed by the following equation (3):

$$T_{BUF1}[\sec]=Q_{FL}/V \qquad (3)$$

It should be noted that while the CPU 33 is executing the processing at step SP36, the buffer memory 34 is empty at the time data recording on the tape is completed at step SP34, and afterward data transferred from the host computer 12 is being accumulated in the empty buffer memory 34. Therefore, the determination at step SP36 is made to see whether data is accumulating into the buffer memory 34 too slowly as compared with the tolerable time $T_{TH1}$.

In this embodiment, the tolerable time $T_{TH1}$ is selected to be a sum of a time required to resume the standby-on state, which causes the rotary drum 23 to rotate and the tape 22 to be applied with tension, immediately after the digital VTR 20 is set into the standby-off state, in which the tape 22 is released from tension applied thereto and the rotary drum 23 is stopped (actually it takes approximately ten seconds), and a time required for the tape 22 to run from a roll-in position to an in-point position from the standby-on state (approximately two seconds in this embodiment). Thus, the tolerable time $T_{TH1}$ is calculated to be 12 seconds (10+2= 12).

When an affirmative result is obtained at step SP36, this means that it is predicted that data from the host computer 12 is being accumulated into the buffer memory 34 at a data transfer speed V which permits the buffer memory 34 to be filled with the data before the approach run of the tape 22 is completed with the digital VTR 20 set into the standby-on state immediately after it was set into the standby-off state.

Then, the CPU 33, determining that it is not necessary to set the digital VTR 20 into the standby-off state, returns to the foregoing step SP32 with the digital VTR 20 remaining in the standby-on state, and executes the loop of steps SP32–SP33–SP32 to wait for the digital VTR 20 to start recording data on the tape 22.

On the other hand, if a negative result is obtained at step SP36, this means that data is being transferred from the host computer 12 to the buffer memory 34 at a data transfer speed too slow to fill the buffer memory 34 with data even after the lapse of the tolerable time $T_{TH1}$ which is a time period until the approach run of the tape 22 is completed with the digital VTR 20 set into the standby-on state immediately after it was set into the standby-off state. In this event, the CPU 33 controls the system control circuit 25 to set the digital VTR 20 into the standby-off state at step SP37.

In this way, by predicting that it will take a very long time to fill the buffer memory 34 with data due to a slow transfer speed of data from the host computer 12 to the buffer memory 34, the digital VTR 20 is controlled to be set into the standby-off state to avoid damages on the tape 22.

The CPU 33, after performing the standby-on control at step SP37, measures at step SP38 a data transfer speed V of data transferred from the host computer 12 to the buffer memory 34 through the computer interface unit 31, and then at step SP39 calculates an accumulation time $T_{BUF2}$ [sec] required to accumulate data in an empty region of the buffer memory 34 by the following equation (4):

$$T_{BUF2}[\sec]=(Q_{FL}-Q_{NW})/V \qquad (4)$$

and determines whether or not the required accumulation time $T_{BUF2}$ is shorter than the tolerable time $T_{TH1}$ [sec]. In the equation (4), $Q_{FL}$ is the storing capacity of the buffer memory 34 [bytes]; and $Q_{NW}$ is a current data amount in the buffer memory 34 [bytes] which may be calculated by the buffer memory data remaining amount calculator circuit 41 (FIG. 7).

If an affirmative result is obtained at step SP39, this means that it can be predicted that an accumulating speed of data transferred from the host computer 12 to the buffer memory 34 is fact enough to fill the buffer memory with the data before the tolerable time $T_{TH1}$ is over, after the digital VTR 20 was controlled to be set into the standby-off state. The CPU 34 responsively returns to step SP31 to control the system control circuit 25 to set the digital VTR 20 into the standby-on state.

On the other hand, if a negative result is obtained at step SP39, this means that it can be predicted that the data transfer speed V from the host computer 12 to the buffer memory 34 is so slow that a time required to accumulate data in an empty region of the buffer memory 34 will exceed the tolerable time $T_{TH1}$. The CPU 33 responsively returns to step SP38 to wait for the required accumulation time $T_{BUF2}$ for filling an empty portion of the buffer memory 34 with data, to be shorter than the tolerable time $T_{TH1}$ by repeatedly executing a loop of steps SP38–SP39–SP38.

The empty region of the buffer memory 34 is gradually filled with data transferred from the host computer 12, and when an affirmative result is eventually obtained at step SP39, the CPU 33 exits the loop of steps SP38 and SP39 to step SP31.

Incidentally, if an affirmative result is obtained at step SP33 while the CPU 33 is waiting for the digital VTR 20 to start recording data on the tape 22 by repeating the loop of steps SP32–SP33–SP32 after performing the standby-on control at step SP31, this means that the standby tolerable time set to three minutes, during which the digital VTR 20 is allowed to remain in the standby-on state, has elapsed. In this event, the CPU 33, determining that the tape 22 would be damaged if the digital VTR 20 were still maintained in the standby-on state, controls the digital VTR 20 to be set into the standby-off state at step 40, and then waits for the buffer memory 34 to be filled with data by repeating the loop of steps SP38–SP39–SP38.

In this way, when a tape write instruction has not been generated for a long time, the digital VTR 20 is controlled from the standby-on state to the standby-off state to avoid damages on the tape 22.

According to the foregoing configuration, when the data transfer speed V from the host computer 12 to the buffer memory 34 is fast enough, the CPU 33 executes a loop of steps SP32–SP34–SP35–SP36–SP32 to maintain the digital VTR 20 in the standby-on state since data is required to be sequentially supplied from the buffer memory 34 to the digital VTR 20 and since the required accumulation time $T_{BUF1}$ for accumulate data in buffer memory 34 from an empty state to a fully loaded state is shorter than the tolerable time $T_{TH1}$.

On the other hand, when the data transfer speed V from the host computer 12 to the buffer memory 34 is so low that the required accumulation time $T_{BUF1}$ for filling the empty buffer memory 34 with data becomes longer than the tolerable time $T_{TH1}$, the CPU 33 executes a loop of steps SP38–SP39–SP38 to maintain the digital VTR 20 in the standby-off state while controlling the digital VTR 20 to wait for the required accumulation time $T_{BUF1}$ for filling the empty buffer memory 34 with data to be shorter than the tolerable time $T_{TH1}$, thus preventing damages on the tape 22.

Further, when the digital VTR 20 maintained in the standby-on state is waiting for a tape recording start instruction while a loop of steps SP32–SP33–SP32 is being repeated, if this state remains for more than the standby tolerable time of three minutes, the CPU 33 controls the digital VTR 20 to be set into the standby-off state in response to the affirmative result at step SP40, and executes the loop of steps SP38–SP39–SP38 to wait for the required accumulation time $T_{BUF2}$ to become shorter than the tolerable time $T_{TH1}$, thus avoiding possible damages on the tape 22 which would otherwise occur if the digital VTR 20 were maintained in the standby-on state for more than three minutes of the standby tolerable time.

(5) Data Read Processing Routine

Figure 13:
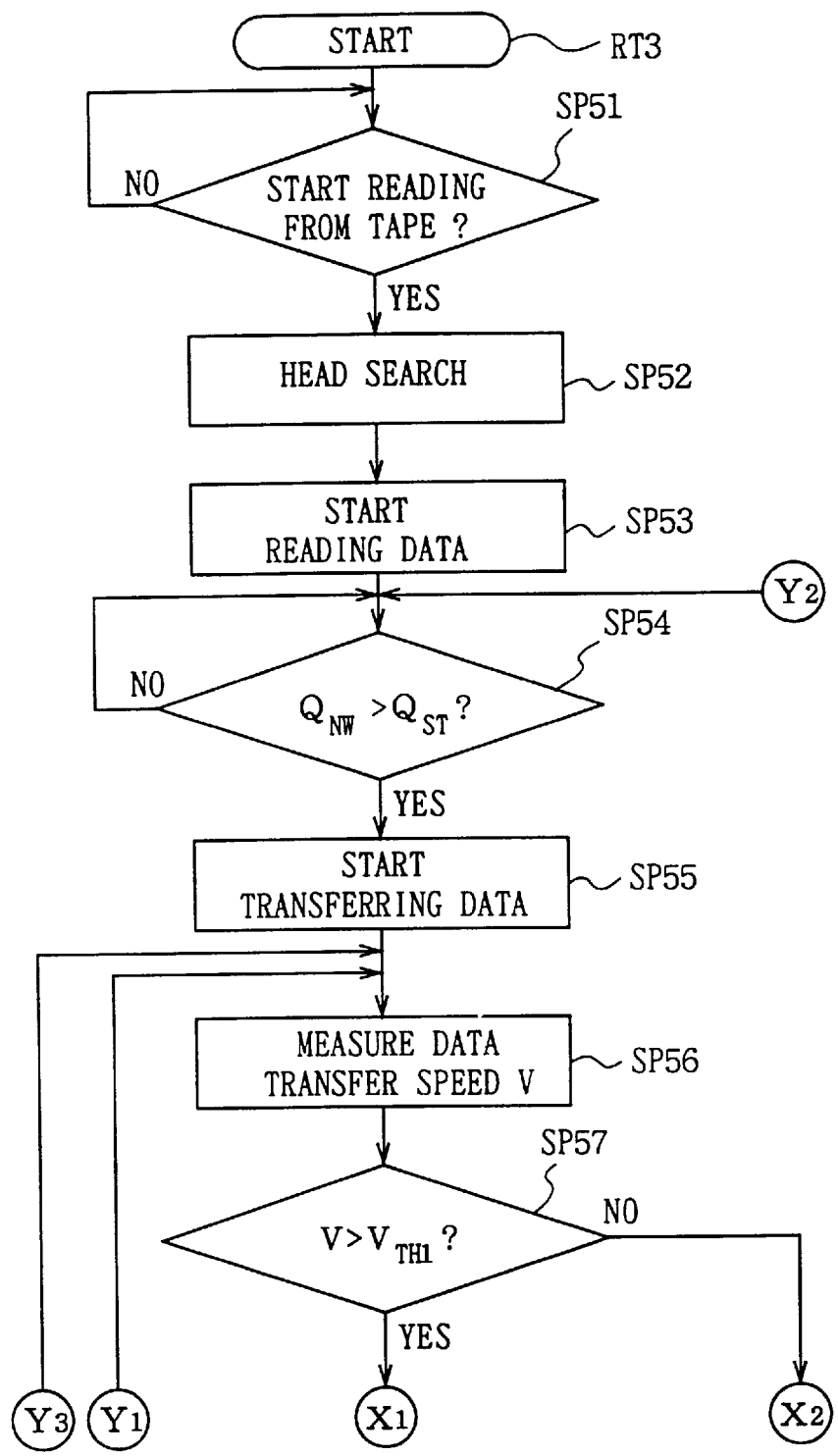
FIGS. 13 and 14 show in combination a flow chart representing a data read processing routine.
Figure 14:
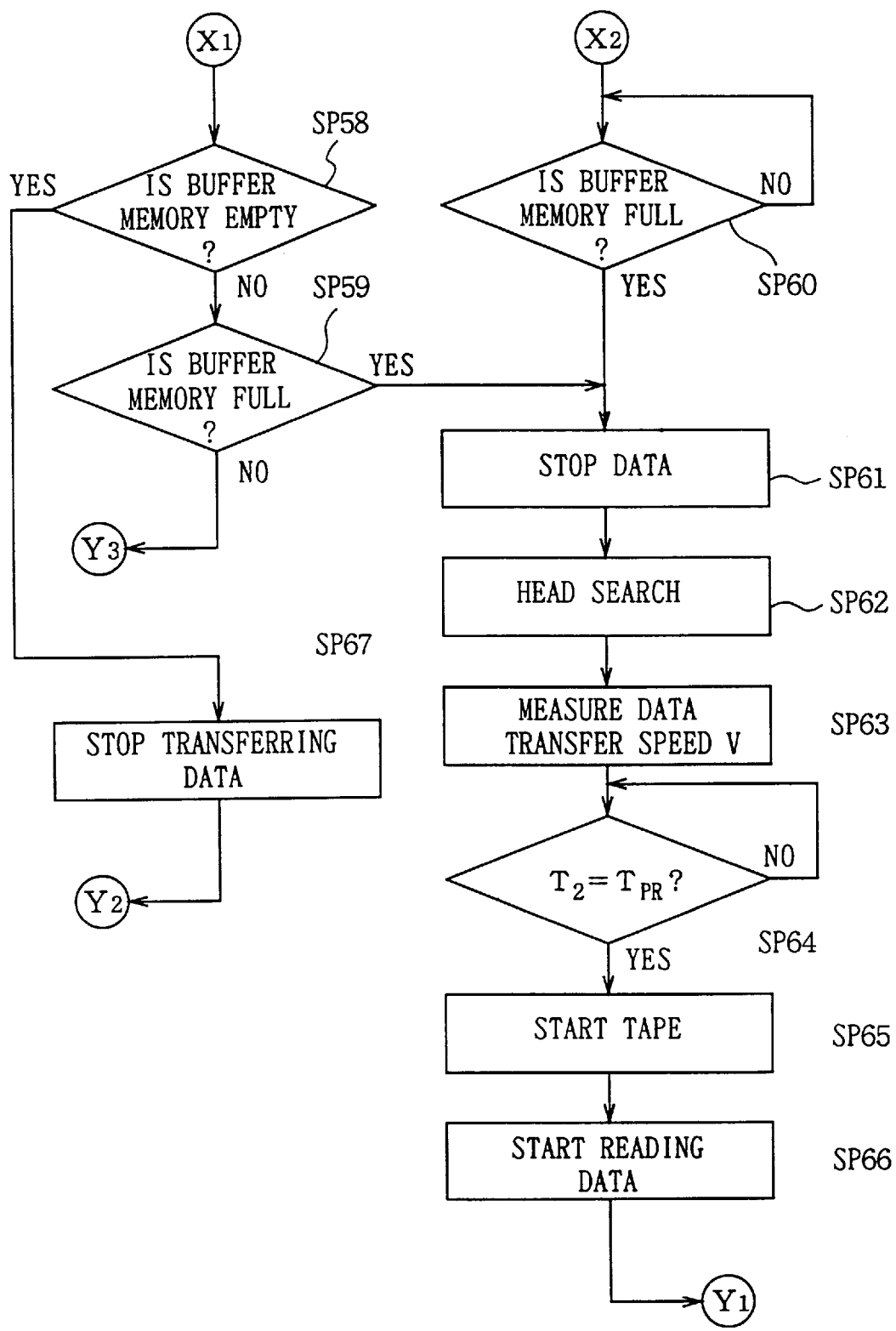

The CPU 33 executes a data read processing routine RT3 shown in FIGS. 13 and 14 when the host computer 12 reads data from the digital VTR 20 in the data recording unit 15.

The CPU 33, when entering the data read processing routine RT3, first determines at step SP51 whether or not a read start request is sent from the host computer 12. If so, the CPU 33 instructs the system control circuit 25 for the digital VTR 20 to perform a head search at step S52 and to start reading data at step SP53. The read data is stored into the buffer memory 34 through the signal processing circuit 27 and the process interface unit 38.

In this state, at step SP54, the CPU 33 waits until a current data amount $Q_{NW}$ in the buffer memory exceeds such a data amount that can be read from the buffer memory 34 to the host computer 12 through the computer interface unit 31, i.e., a transfer allowable data amount $Q_{ST}$ (for example, selected to be 384 k [bytes]). When an affirmative result is eventually obtained at step SP54, the CPU 33 starts transferring data in the buffer memory 34 to the host computer 12 through the computer interface 31 at step SP55.

Subsequently, the CPU 33 measures a data transfer speed of data transferred to the host computer 12 through the computer interface unit 31 at step SP56, and determines at step SP57 whether or not the data transfer speed is equal to or higher than a reference value $V_{TH1}$ (for example, selected to 8M [bytes/sec]).

If an affirmative result is obtained at step SP57, it means that data can be transferred from the buffer memory 34 to the host computer 12 through the computer interface unit 31 at a considerably high transfer speed. In this event, the CPU 33 monitors at step SP58 whether or not the buffer memory 34 is empty, and determines at step SP59 whether or not the buffer memory 34 is filled with data. If a negative result is obtained at both steps, the CPU 33 returns to the foregoing step SP56. Subsequently, the CPU 33 maintains the transfer of data reproduced from the digital VTR 20 and stored in the buffer memory 34 to the host computer 12 through the computer interface unit 31 by repeatedly executing a loop of steps SP56–SP57–SP58–SP59–SP56.

In this state, if a negative result is obtained at step S57, it means that it is predicted that the transfer speed of data transferred from the buffer memory 34 to the host computer 12 is so low that the buffer memory 34 will be shortly filled with data reproduced by the digital VTR 20.

Then, the CPU 33 monitors at step SP60 whether or not the buffer memory 34 is filled with data, and stops the tape 22 at step SP61 and performs a head search at next step SP62 if an affirmative result is obtained at step SP60.

In this state, the CPU 33 measures at next step SP63 a transfer speed V of data transferred from the buffer memory 34 to the host computer 12, and calculates an empty prediction time $T_2$ indicative of a time at which the buffer memory 34 is predicted to be exhausted, based on the measured transfer speed by the following equation (5):

$$T_2[\text{sec}]=(Q_{FL}Q_{NW})/V \qquad (5)$$

Then, the CPU 33 determines at step SP64 whether or not the empty prediction time $T_2$ is equal to the approach run time $T_{PR}$ (two seconds) of the tape 22 set in the digital VTR 20.

If an affirmative result is obtained at step SP64, this means that if the tape 22 is started now, the approach run time of the tape 22 is over at the same time the buffer memory 34 is exhausted, so that accumulation of data on the tape 22 in the buffer memory 34 can be immediately started.

The CPU 33 responsively runs the tape 22 at next step SP65, starts reading data at step SP66, and returns to the foregoing step SP56.

In this way, when the transfer speed of data from the buffer memory 34 to the host computer 12 is low, repetitive start and stop of the digital VTR 20 is maximally avoided and data can be continuously transferred to the host computer 12 without interruption by making the most of the storing capacity of the buffer memory 34 (for example, 16M [bytes]).

On the other hand, if the determination result at step SP58 indicates that the buffer memory 34 is empty, the CPU 33 stops transferring data to the host computer 12 at step SP67, and then returns to the foregoing step SP54 to thereby execute the processing for accumulating data reproduced from the tape 22 by the digital VTR 20 in the buffer memory 34.

Turning again to step SP59, if the determination result at step SP59 indicates that the buffer memory 34 is filled with data, the CPU 33 proceeds to the foregoing step SP61 to stop the tape 22 and continue to transfer data to the host computer 12 until data in the buffer memory 34 is exhausted.

According to the foregoing configuration, when data is being transferred from the buffer memory 34 to the host computer 12 at a relatively high transfer speed, the CPU 33 can transfer data reproduced from the tape 22 by the digital VTR 20 and stored in the buffer memory 34 to the host computer 12 while leaving the digital VTR 20 to continuously reproduce the tape 22.

On the other hand, if data in the buffer memory 34 is not continuously transferred to the host computer 12, data can be reproduced from the tape 22 while the digital VTR 20 is controlled so as to maximally avoid the repetitive reproduction and stop operations by first filling the buffer memory 34 with data and transferring at a stroke all data stored in the buffer memory 34 to the host computer 12.

(6) Other Embodiments (6-1) The embodiments discussed above have dealt with the case where the SCSI standard is employed for the host computer interface unit 14. However, the host computer interface is not limited to this, but the present invention can be applied to data recorders employing any of numerous other interfaces including IEEE-488 (GP-IB), VME, HIPPI, IPI, IBE, RS-2324, a variety of local area networks and so on, similarly to the foregoing embodiments.

(6-2) The embodiments discussed above have dealt with the case where a digital VTR is employed as a recording means in the data recording unit 15. However, the recording means is not limited to this, but a disk recorder using a magneto-optical disk, a hard disk drive, or the like as a recording medium can also be employed, and similar effects to the foregoing can be produced.

It should be noted that when a disk recorder is employed, a seek time should be considered as a factor corresponding to the head search of a tape, and a rotational delay time of a disk also exists as a factor which may cause deterioration of recording efficiency instead of the approach run time of a tape. Since the next write start time or the next but one write start time can be calculated from a current head position, an optical control scheme for the rotational delay time of a disk may be realized based on the thus calculated write start time.

(6-3) The embodiments discussed above have dealt with the case where the digital VTR 20 is assumed to record and reproduce data at a fixed speed (10M [bytes/sec]). However, a recording means employed in the present invention is not limited to this fixed speed type but can be a variable speed VTR which may switch the recording/reproducing speed among 23, 26, 8, 4, 2, and 1.33M [bytes/sec].

In this case, the recording speed on the recording means side may be switched in accordance with data input.

With such a variable speed recording means, the tape speed may be set to a maximum value not exceeding a data transfer speed defined to the SCSI interface if great account is made so as not to stop the tape, while the data speed on the recording means side may be always set to the highest value if the speed on the data input side should be considered as the most importance.

(7) According to the present invention as described above, since the drive and stop control for a recording medium driving mechanism is adaptively controlled in accordance with a data transfer speed on the data input side, input data can be recorded on a recording medium with a much higher efficiency.

Also according to the present invention, when a tape is used as a recording medium, a standby state, in which the recording means remains ready for recording and the tape is applied with tension, is maximally avoided, so that damages otherwise given to the tape can be largely reduced.

Industrial Applicability

As will be appreciated from the foregoing description, the present invention can be widely utilized in the field of data storage apparatus for storing a large amount of digital data. Specifically, the present invention can be applied to a recording apparatus for recording computer data like the foregoing embodiment, to a recording apparatus for experiment data which may be obtained by a dedicated experiment data collector in a variety of experiment instruments, and to an observation apparatus for recording a variety of observation data.

I claim:

1. A data recording apparatus for recording data transferred from a data supply source on a tape-like recording medium, comprising:

measuring means for measuring a transfer speed of the data transferred from said data supply source;

a memory for temporarily storing the data transferred from said data supply source;

recording means for recording the data read from said memory on said tape-like recording medium;

control means for controlling a reading operation of said memory for reading the data therefrom, a running operation of said recording medium for running said tape-like recording medium, and a recording operation of said recording means for recording the data on said tape-like recording medium, based on said data transfer speed measured by said measuring means such that said control means starts running said tape-like recording medium when determining that a transfer speed measured by said measuring means is higher than a predetermined speed; and detecting means for detecting an amount of data remaining in said memory, wherein said control means controls the reading operation of said memory for reading the data therefrom and the recording operation of said recording means for recording the data, based on a detection result indicated by said detecting means, and wherein:

said control means holds first time information indicative of a time required for said recording means to stably run said tape-like recording medium, and when said control means determines that the transfer speed measured by said measuring means is lower than said predetermined speed, said control means predicts a time at which said memory has run out of an empty region based on said data transfer speed measured by said measuring means and the detection result of said detecting means, and starts running said tape-like recording medium before the time indicated by said first time information form said predicted time.

2. A data recording apparatus for recording data transferred from a data supply source on a tape-like recording medium, comprising:

measuring means for measuring a transfer speed of the data transferred from said data supply source;

a memory for temporarily storing the data transferred from said data supply source;

recording means for recording the data read from said memory on said tape-like recording medium; and control means for controlling a reading operation of said memory for reading the data therefrom, a running operation of said recording medium for running said tape-like recording medium, and a recording operation of said recording means for recording the data on said tape-like recording medium, based on said data transfer speed measured by said measuring means, wherein:

said recording means has a recording state for recording said data on said tape-like recording medium, a record preparing state before starting the running of said tape-like recording medium, and a record ending state other than said recording state and said record preparing state; and said control means switches between said record preparing state and said record ending state based on said data transfer speed measured by said measuring means.

3. The data recording apparatus according to claim 2, wherein:

said recording means has a rotary drum around which said tape-like recording medium is wrapped, and said record preparing state of said recording means is a state in which said rotary drum is rotated at a constant speed and said tape-like recording medium is applied with predetermined tension, while said recording ending state is a state in which said rotary drum is stopped and said tape-like recording medium is not applied with tension.

4. The data recording apparatus according to claim 3, wherein:

said control means switches said recording medium from said record preparing state to said record ending state when said data transfer speed measured by said measuring means after said recording means has recorded said data is lower than a predetermined value.

5. A recording method for temporarily storing data transferred from a data supply source into a memory and recording data read from said memory on a tape-like recording medium, comprising the steps of:

rewinding said tape-like recording medium beyond a record starting position of said tape-like recording medium;

measuring a transfer speed of said data from said data supply source;

determining whether said measured data transfer speed is higher than a predetermined value;

instructing recording means to run said tape-like recording medium when said data transfer speed is higher than said predetermined value;

detecting a data capacity in an empty region of said memory, and determining whether or not said data capacity in said empty region is equal to or smaller than a predetermined value; and recording data on said tape-like recording medium from the starting position when determining that said data capacity in said empty region is equal to or smaller than said predetermined value.

* * * * *